Feb. 28, 1961   J. W. YOUNG   2,973,112
FRUIT PICKER

Filed Jan. 23, 1957   3 Sheets-Sheet 1

Inventor:
John W. Young
By Munson H bare
Atty.

Feb. 28, 1961  J. W. YOUNG  2,973,112
FRUIT PICKER
Filed Jan. 23, 1957  3 Sheets-Sheet 2
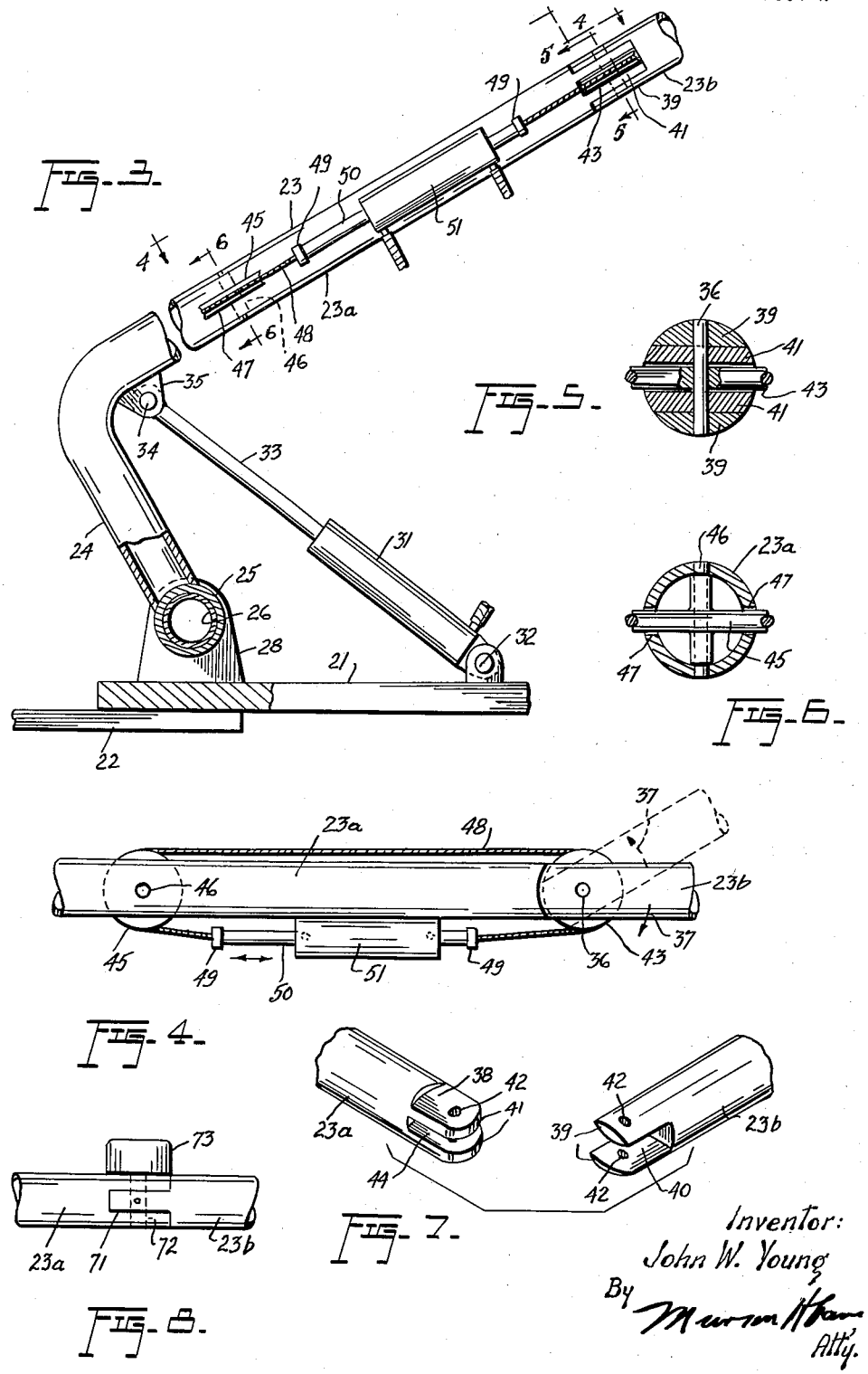
Inventor:
John W. Young
By
Atty.

Feb. 28, 1961   J. W. YOUNG   2,973,112
FRUIT PICKER

Filed Jan. 23, 1957   3 Sheets-Sheet 3

Inventor:
John W. Young
By [signature]
Atty.

United States Patent Office 2,973,112
Patented Feb. 28, 1961

2,973,112
FRUIT PICKER
John W. Young, Barrington, R.I.
(815 N. Glenwood Ave., Clearwater, Fla.)
Filed Jan. 23, 1957, Ser. No. 635,870
4 Claims. (Cl. 214—83.1)

This invention relates to new and useful improvements in adjustable travelling platforms, and in particular the invention concerns itself with a movable platform apparatus such as may be effectively employed by fruit pickers while they are engaged in gathering crop from trees, tall bushes, and the like.

The principal object of the invention is to substantially expedite the crop gathering operation as compared to the conventional manner of using ladders to reach the fruit on trees, this object being attained by the provision of a platform to accommodate the fruit picker, and means for universally moving or adjusting the platform so that the picker may dispose himself in any desired position relative to a tree for the purpose of reaching and picking the fruit.

An important feature of the invention, therefore, resides in the provision of the adjustable platform supporting means, the same being in the form of an articulated boom capable of being raised and lowered as well as revolved and angulated within its own length, so that the platform carried thereby may be positioned at any desired point with respect to a tree.

Another important feature of the invention resides in the provision of power means for moving or adjusting the boom, and in the provision of control means for the power means, such control means being located at the operator's platform so that the operator, that is, the fruit picker himself, may effect adjustment of the boom and move himself from one position to another in accordance with the progress of his work.

Another important feature of the invention resides in the provision of a wheeled base or chassis on which the adjustable boom is mounted for travelling from one tree to another, which base may be either self-propelled or drawn by a tractor, or the like.

Another important feature of the invention resides in the provision of a fruit receptacle on the aforementioned base or chassis, a funnel-shaped receiver at the platform, and a flexible hose which extends from the receiver to the receptacle, whereby the operator may deposit picked fruit in the receiver for gravitational delivery through the flexible hose into the receptacle, thus eliminating the inconvenience which conventionally resulted from the necessity of the fruit picker carrying a bag on his person to accommodate picked fruit.

Some of the advantages of the invention reside in its simplicity of construction, efficient and expeditious operation, and in its adaptability to economical manufacture.

With the above more important objects and features in view and such other objects and features as may become apparent as this specification proceeds, the invention will be understood from the following description taken in conjunction with the accompanying drawings, wherein like characters of reference are used to designate like parts, and wherein for illustrative purposes:

Figure 3 is a fragmentary side elevational view of the adjustable boom, the same being shown on an enlarged scale and partially broken away;

Figure 4 is a fragmentary top plan view, taken substantially in the plane of the line 4—4 in Figure 3;

Figure 5 is a sectional detail, taken substantially in the plane of the line 5—5 in Figure 3;

Figure 6 is a sectional detail, taken substantially in the plane of the line 6—6 in Figure 3;

Figure 7 is a fragmentary group perspective view showing adjacent ends of the boom sections;

Figure 8 is a fragmentary side elevational view of a modified form of the boom sections and their actuating means;

Figure 1:
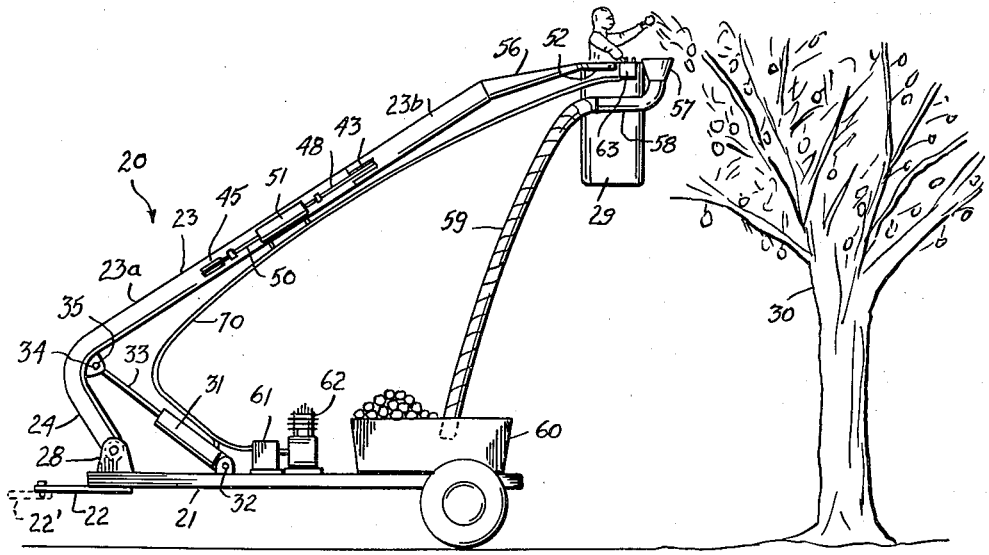
Figure 1 is a side elevational view of the invention in use.
Figure 2:
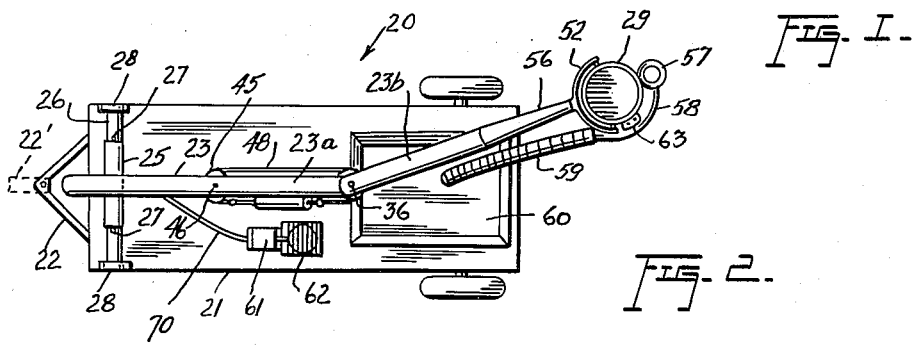
Figure 2 is a top plan view of the invention.

Referring now to the accompanying drawings in detail, particularly Figures 1–7 and 9–11 inclusive, the apparatus in accordance with the invention is designated generally by the reference numeral 20 and embodies in its construction a wheeled base or chassis 21 provided with a suitable hitch 22 for connection to the draw-bar 22' of a tractor, or the like. Alternatively, the chassis may be self-propelled, if desired.

In any event, an adjustable, articulated boom 23 is mounted on the chassis 21, the lower end portion of this boom being downturned as indicated at 24 and secured to a horizontal tubular member 25 which is rotatably mounted on a stationary shaft 26 and is prevented from sliding longitudinally thereon by suitable pins or stops 27. The shaft 26 extends transversely of the chassis 21 and is secured thereto at the ends thereof by suitable brackets 28. It will be apparent from the foregoing that the boom may be swung in a vertical plane on the axis of the shaft 26, so that an operator's or fruit picker's platform 29, carried by the outer end of the boom, may be raised or lowered to any desired level with respect to a tree 30 from which fruit is to be picked.

The raising and lowering of the boom 23 is effected by a hydraulic cylinder 31 pivoted to the chassis 21 at 32 and having a piston rod 33 pivoted at 34 to a suitable bracket 35 on the boom. The cylinder 31 may be single-acting so as to raise the boom and permit lowering thereof by gravity.

The boom 23 includes a lower section 23a and an upper section 23b, these two sections being connected together with a pivot pin 36 which, being disposed in the vertical plane of swinging of the boom, permits the upper section 23b to be swung to either side of the lower section 23a, as illustrated by the arrows 37 in Figure 4.

As is best shown in Figure 7, the boom section 23a is provided at the top and bottom thereof with recesses 38 to receive projecting tongues 39 at the top and bottom of the boom section 23b, the space 40 existing between the tongues 39 receiving therein a pair of projecting ears 41 on the boom section 23a. The tongues 39 and ears 41 are formed with registering apertures 42 to accommodate the pivot pin 36, so that the two boom sections are connected together in a hinge-like manner.

The pin 36 is freely rotatable in the apertures of the ears 41 but is secured in the apertures of the tongues 39, so that the pin turns with the boom section 23b. It may be noted at this point that the boom sections are preferably formed from tubular material, but are provided with solid fillers at their adjacent ends, to facilitate formation of the hinge tongues and ears above mentioned.

A pulley 43 is rigidly secured to the pin 36 and disposed in a space 44 existing between the ears 41, the pulley 43 being larger in diameter than the boom sections so that it projects outwardly to both sides thereof. A similar pulley 45 is mounted upon a pin 46 in a transverse slot or opening 47 formed in the boom section 23a, and a cable 48 passes around the pulleys 43, 45, having its ends secured to bosses 49 at the ends of a piston rod 50 of a double-acting hydraulic cylinder 51. The latter is suitably secured to one side of the boom section 23a and it will be apparent from the foregoing that when the cylinder 51 is energized, the sliding of the piston rod 50 will cause the cable 48 to turn the pulleys 43, 45 and swing the boom section 23b to one side or the other of the section 23a, with the rotation of the pulley 43. In this manner the operator's platform 29 may be moved laterally to different positions around the tree at any given operating level.

The platform 29, which is preferably in the form of a cylindrical housing having a closed bottom and an open top, is intended to accommodate the operator, that is, the fruit picker therein, as shown in Figure 1. The platform 29 is supported at the upper end thereof in a yoke 52 having a pair of trunnions 53 pivotally connected to the platform, so that the platform may assume a substantially vertical or upright position, regardless of the position of the supporting boom. This is further facilitated by providing the yoke 52 with a supporting stud 54 which is rotatably journalled in a bearing 55 formed in a rigid extension 56 of the boom section 23b, the axis of the stud 54 being disposed at right angles to the axis of the trunnions 53 so that the platform 29 is supported by the boom in a universal manner and in a substantially upright position by gravity, regardless of the position of the boom.

Mounted at the upper edge of the platform 29 is a funnel-shaped receiver 57 for picked fruit, the same communicating with an arcuate conduit 58 which extends around to one side of the platform and has connected thereto a flexible hose 59. A receptacle 60 for picked fruit is provided on the chassis 21 and the lower end of the hose 59 is directed into this receptacle, so that the operator may deposit picked fruit into the receiver 57 for delivery by gravity through the conduit 58 and hose 59 into the receptacle 60. In this manner the conventional inconvenience of the picker having to carry a bag, or the like, for picked fruit on his person is eliminated, and the fruit is expeditiously delivered to the receptacle 60 without any danger of bruising or other mutilation.

The cylinders 31, 51 are actuated by hydraulic fluid under pressure from a suitable pump 61 mounted on the chassis 21 and driven by a small gasoline engine 62 which, if desired, may also be used for propelling the chassis along the ground from one tree to another. The operation of the cylinders 31, 51 is controlled by the fruit picker himself from the platform 29, this being effected by the provision of a control box 63 at the upper edge of the platform, containing the hydraulic valves 64, 65.

The valve 64 is a two-way valve adapted to deliver fluid under pressure through a line 66 from the pump 61 to the lower end of the boom raising cylinder 31, or to return fluid from that cylinder to the pump through a line 67 when the boom is lowered by gravity. The valve 65 is a three-way valve, adapted to either deliver fluid from the pump to one end of the cylinder 51 through a line 68 while returning fluid from the other end of the cylinder through a line 69, or to deliver fluid to the cylinder through the line 69 while returning fluid through the line 68. Thus, the valve 65 may be used to actuate the cylinder 51 selectively in opposite directions, to turn the boom section 23b to the respectively opposite sides of the boom section 23a.

The various fluid lines 66, 67, 68, 69 are preferably grouped into a flexible harness 70 extending freely from the chassis 21 alongside the boom 23, as shown in Figure 1.

If preferred, the distribution of fluid to the cylinders 31, 51 may be controlled by electric solenoid valves rather than by hydraulic valves, so that electric wires are used in the harness 70 in place of fluid lines.

Figure 8 shows a modified form of power actuating means between the boom sections 23a and 23b, wherein such sections are provided with a hinge-type joint 71 including a hinge or pivot pin 72. The latter is freely rotatable in the section 23a but is held against rotation in the section 23b and is actuated by a conventional hydramotor 73 secured to the section 23a. Thus, when the hydramotor 73 is energized, the boom section 23b will be swung to one side or the other of the section 23a. This arrangement eliminates the cylinder 51, cable 48 and pulleys 43, 45, previously described.

Figures 12, 14:
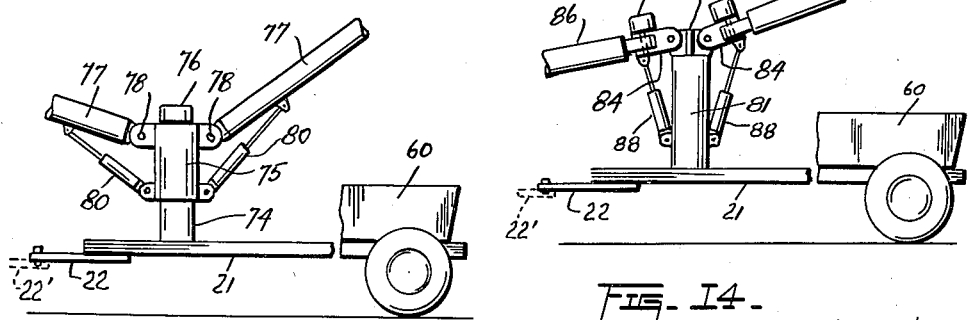
Figure 12 is a fragmentary side elevational view showing a modified form of the boom mounting.
Figure 14 is a fragmentary side elevational view showing another modified form of the boom mounting.
Figure 9:
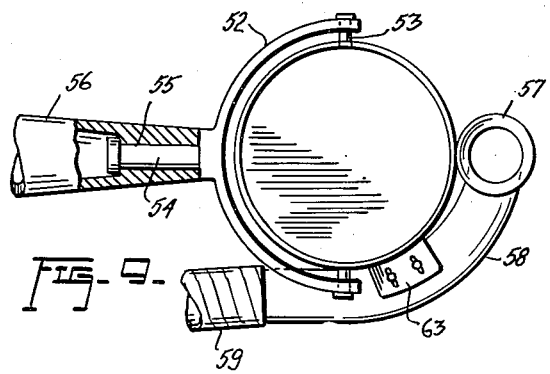
Figure 9 is a top plan view, on an enlarged scale of the platform and its supporting means.
Figure 10:
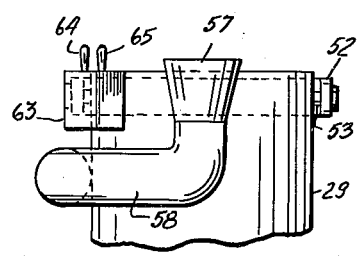
Figure 10 is a fragmentary front elevational view of the platform.
Figure 13:
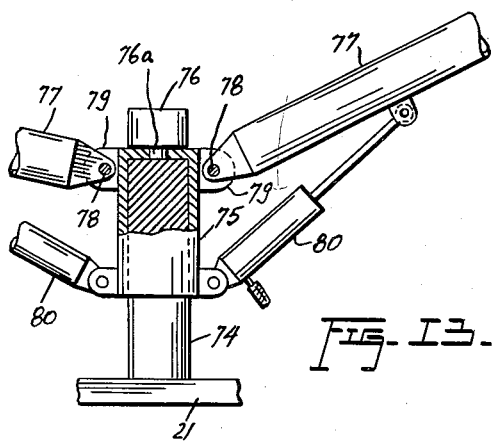
Figure 13 is a fragmentary side elevational view on an enlarged scale and partially in section, of the subject shown in Figure 12.
Figure 11:
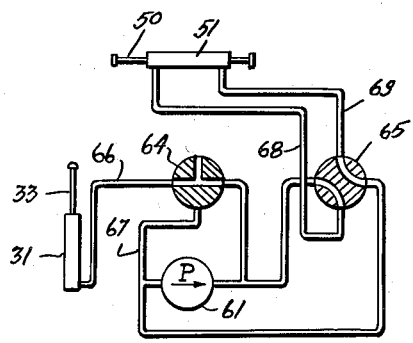
Figure 11 is a diagrammatic view of the hydraulic components used in the invention.

Figures 12 and 13 illustrate a modified form of the boom mounting means on the chassis 21, the same comprising an upright standard 74 secured to the chassis and provided with a rotatable cap 75, rotated by a conventional hydramotor 76. Two or more booms 77, similar to the aforementioned boom 23, are pivotally connected at 78 to suitable ears 79 provided on the upper end portion of the cap 75, these booms being raised and lowered independently of each other by hydraulic cylinders 80. The booms are rotated simultaneously in a horizontal plane by rotation of the cap 75 on the standard 74, it being noted that while the hydramotor 76 is secured to the cap, the actuating shaft 76a thereof is rigid with the standard.

Figure 15:
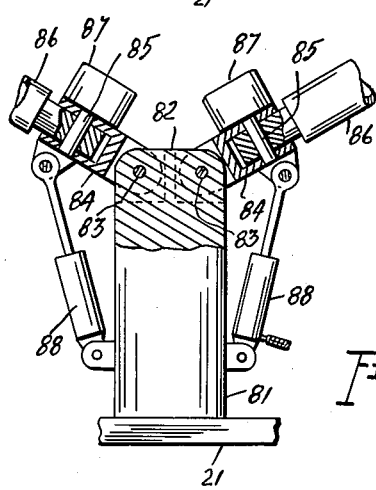
Figure 15 is a fragmentary side elevational view on an enlarged scale and partially in section, of the subject shown in Figure 14.
Figure 16:
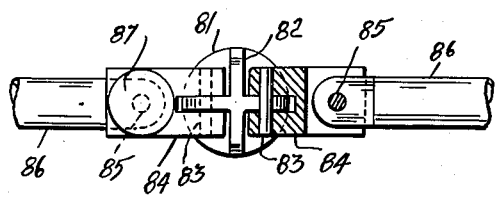
Figure 16 is a fragmentary top plan view of the boom mounting shown in Figures 14 and 15, this view also being partly in section.

In another modified form of the boom mounting means shown in Figures 14, 15 and 16, an upright standard 81 on the chassis 21 is provided at the top thereof with a cross-shaped web 82 to which are connected by horizontal pivot pins 83 two or more coupling members 84. The latter, in turn, have connected thereto by pivot pins 85 the booms 86, the pins 85 being actuated by hydramotors 87 secured to the members 84. The pins 85 are rotatable in the members 84 but rigid with the booms 86, so that upon energization of the hydramotors the booms may be swung laterally independently of each other, with relation to their respective coupling members 84. Raising and lowering of the booms 86, also independently of each other, is effected by hydraulic cylinders 88 extending from the standard 81 to the respective coupling members 84, as shown.

As will be readily apparent, the various hydramotors 73, 76, 87 and the various cylinders 31, 51, 80, 88, may be substituted by electric power means, if so preferred.

While in the foregoing there have been shown and described the preferred embodiments of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. An adjustable travelling platform, comprising a wheeled chassis, a boom pivotally mounted on said chassis for swinging in a vertical plane, power means for swinging said boom, said boom comprising a lower section pivoted to the chassis and an upper section pivoted to said lower section for swinging laterally relative thereto, power means for swinging said upper section, a yoke pivotally attached to said upper section for lateral swinging about an axis disposed in the plane of the upper section, an operator's platform pivotally suspended and depending freely from said yoke for swinging about a horizontal axis transverse to the axis of swinging of said yoke whereby said platform may remain substantially upright under gravity regardless of the position of said boom, and control means for said first and second mentioned power means.

2. The device as defined in claim 1 wherein said power means for swinging the upper section of said boom laterally relative to the lower section comprise a pulley provided at the pivotal connection between said sections and rigid with one of them, a second pulley rotatably mounted in the other boom section, a looped cable passing around the first and second mentioned pulleys and having spaced opposing ends, a reciprocable rod carried by said other boom section between the spaced opposing ends of said cable and having the ends of the cable connected to opposite ends of the rod, and a power element for reciprocating said rod, whereby the upper boom section may be swung relative to the lower section upon actuation of said power element.

3. The device as defined in claim 1 together with an upright standard provided on said chassis, and a cap rotatable about an upright axis on said standard, said boom being pivotally connected to said cap for vertical swinging movement and being carried by said cap for rotation therewith on said standard whereby the boom en toto may be swung in a horizontal plane.

4. The device as defined in claim 1 together with an upright standard provided on said chassis, and a coupling member pivoted to said standard for swinging in a vertical plane, said boom being carried by said coupling member and pivotally connected thereto for swinging in a horizontal plane.

References Cited in the file of this patent
UNITED STATES PATENTS

| | | |
|---|---|---|
| 2,450,152 | Miller | Sept. 28, 1948 |
| 2,674,500 | Hukari | Apr. 6, 1954 |
| 2,821,312 | Wiegel | Jan. 28, 1958 |